(12) United States Patent
Cui et al.

(10) Patent No.: US 8,960,215 B2
(45) Date of Patent: Feb. 24, 2015

(54) LEAK PLUGGING IN COMPONENTS WITH FLUID FLOW PASSAGES

(75) Inventors: Yan Cui, Greer, SC (US); Srikanth Chandrudu Kottilingam, Simpsonville, SC (US); Dechao Lin, Greer, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 13/564,987

(22) Filed: Aug. 2, 2012

(65) Prior Publication Data

US 2014/0034144 A1    Feb. 6, 2014

(51) Int. Cl.
*B23P 6/00*    (2006.01)

(52) U.S. Cl.
USPC ............. 137/15.11; 137/315.01; 138/98

(58) Field of Classification Search
USPC ............. 137/15.11, 315.01, 312; 138/98
See application file for complete search history.

(56) References Cited

U.S. PATENT DOCUMENTS

| | | | | |
|---|---|---|---|---|
| 3,472,285 A | * | 10/1969 | Ginsburgh et al. | 138/97 |
| 4,543,781 A | * | 10/1985 | Rice | 60/804 |
| 5,197,324 A | * | 3/1993 | Keys | 73/40.5 R |
| 5,500,064 A | * | 3/1996 | Schinabeck | 156/94 |
| 5,666,643 A | | 9/1997 | Chesnes et al. | |
| 5,732,468 A | | 3/1998 | Galley et al. | |
| 6,128,822 A | | 10/2000 | Nishio et al. | |
| 6,283,356 B1 | | 9/2001 | Messelling | |
| 6,296,006 B1 | * | 10/2001 | Wegner | 137/15.11 |
| 7,165,325 B2 | | 1/2007 | Imano et al. | |
| 8,069,912 B2 | | 12/2011 | Campagna et al. | |
| 2012/0067939 A1 | | 3/2012 | Kool | |

* cited by examiner

*Primary Examiner* — Kevin Lee
(74) *Attorney, Agent, or Firm* — Ernest Cusick; Hoffman Warnick LLC (57) ABSTRACT

A method for repairing a component with a leak are disclosed. In an embodiment, a component having at least one fluid flow path with a leak therein is provided. The component may be made of a first material. A second material may be introduced into the fluid flow path, and propelled into the location of the leak in the flow path. Once there, the second material is melted and solidified, forming a plug that occludes the leak.

20 Claims, 8 Drawing Sheets

LEAK PLUGGING IN COMPONENTS WITH FLUID FLOW PASSAGES

BACKGROUND OF THE INVENTION

The invention relates generally to the manufacture and repair of components having fluid flow passages. More particularly, the invention relates to a brazing procedure for sealing leaks in fluid flow passages in components of turbomachines such as nozzles.

In the design of gas turbine engines, fluid flow through the engine is varied by a plurality of stator vanes and rotor blades. Typically, static nozzle segments direct the flow of a working fluid into stages of turbine blades connected to a rotating rotor. Each nozzle has an airfoil or vane shape configured such that when a set of nozzles are positioned about a rotor of the turbine, they direct the gas flow in an optimal direction and with an optimal pressure against the rotor blades. These vanes typically include cooling passages to prevent overheating and subsequent deforming of the component.

Fabrication of components such as nozzles, particularly using single-crystal materials to withstand higher temperatures, is a cost-intensive endeavor. Once in fully fabricated form, the nozzle may be subjected to hydrotesting to confirm its air- and water-tightness before being installed in a turbomachine. Occasionally, a leak may be found during hydrotesting. One potential solution to address such a leak may be to weld it closed. However, welding may not provide a solution in cases where the leak is not directly accessible, or the weldability of the base material of the component is poor. Another solution has been to use brazing repair methods using a liquid braze filler material. However, a liquid braze filler relies on capillary forces to draw the filler material into the gap causing the leak. Capillary forces cannot be relied upon when the interior surfaces of the component are not completely clean and free of particulate matter.

BRIEF DESCRIPTION OF THE INVENTION

A first aspect of the disclosure provides a method comprising: providing a component having a fluid flow path therein, wherein the component includes a first material; introducing a second material into the fluid flow path; propelling the second material into a leak in the fluid flow path; melting the second material; and solidifying the second material, wherein the solidified second material occludes the leak.

A second aspect of the disclosure provides a component comprising a body comprising a first material, wherein the body includes a first fluid flow path therethrough; an opening in the first material disposed such that the first fluid flow path is not sealably enclosed by the first material; and a second material occluding the opening such that there is no fluid egress from the first fluid flow path.

These and other aspects, advantages and salient features of the invention will become apparent from the following detailed description, which, when taken in conjunction with the annexed drawings, where like parts are designated by like reference characters throughout the drawings, disclose embodiments of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

At least one embodiment of the present invention is described below in reference to its application in connection with and operation of a turbomachine in the form of a gas turbine, and particularly in connection with components such as nozzles used in gas turbines. Further, at least one embodiment of the present invention is described below in reference to a nominal size and including a set of nominal dimensions. However, it should be apparent to those skilled in the art and guided by the teachings herein that embodiments of the present invention are likewise applicable to any suitable turbine and/or engine, such as, e.g., a steam turbine, and any suitable components thereof. Further, it should be apparent to those skilled in the art and guided by the teachings herein that embodiments of the present invention are likewise applicable to various scales of the nominal size and/or nominal dimensions.

Figure 1:
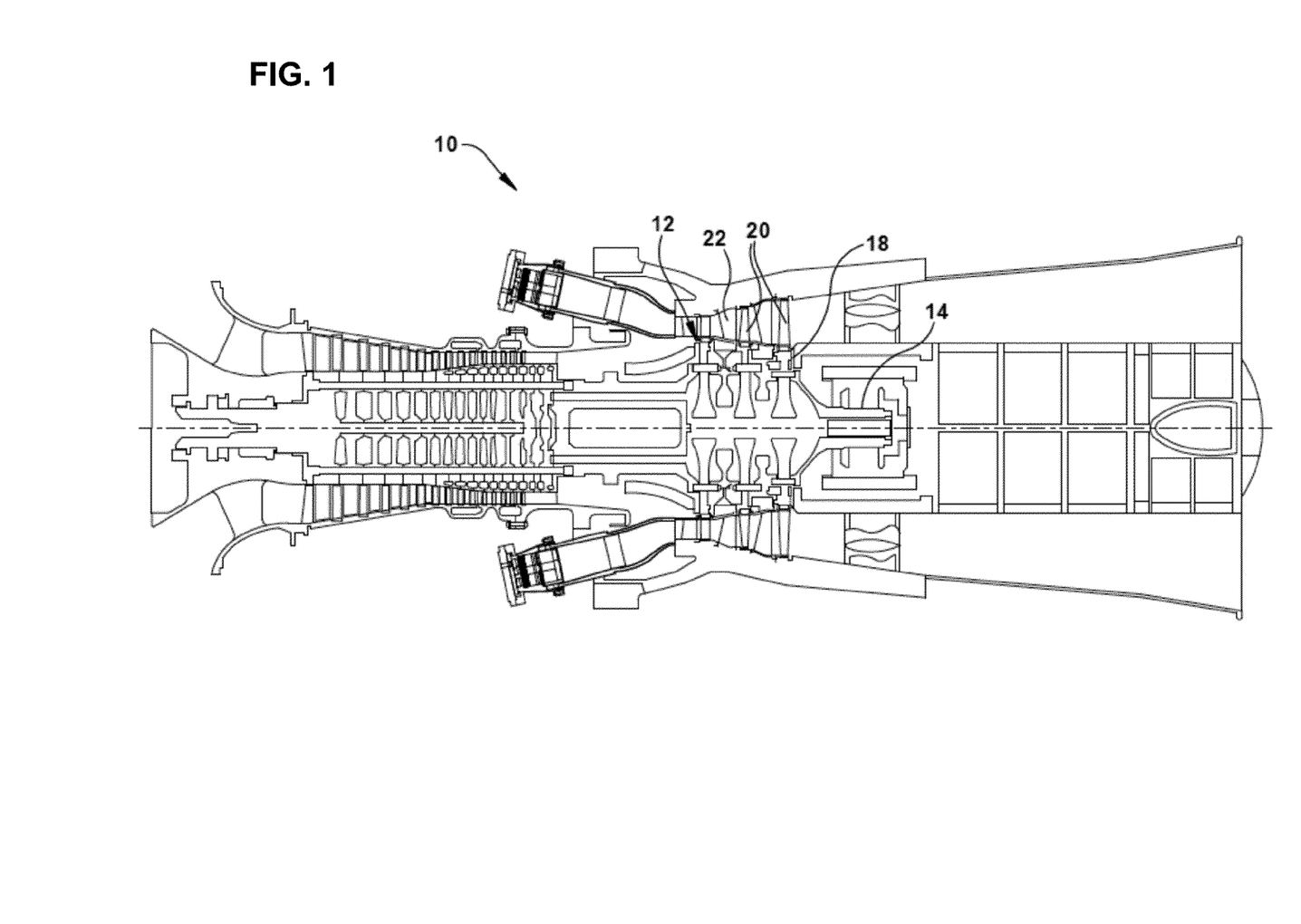
FIG. 1 shows a cross sectional illustration of a gas turbine in accordance with an embodiment of the invention.

With reference to FIG. 1, gas turbine 10 includes a rotor 12 that includes a shaft 14 and a plurality of axially spaced rotor wheels 18. A plurality of rotating blades 20 are mechanically coupled to each rotor wheel 18, such that blades 20 are arranged in rows that extend circumferentially around each rotor wheel 18. A plurality of stationary nozzles are assembled 22 extending circumferentially around shaft 14 and are axially positioned between adjacent rows of blades 20.

Figure 2:
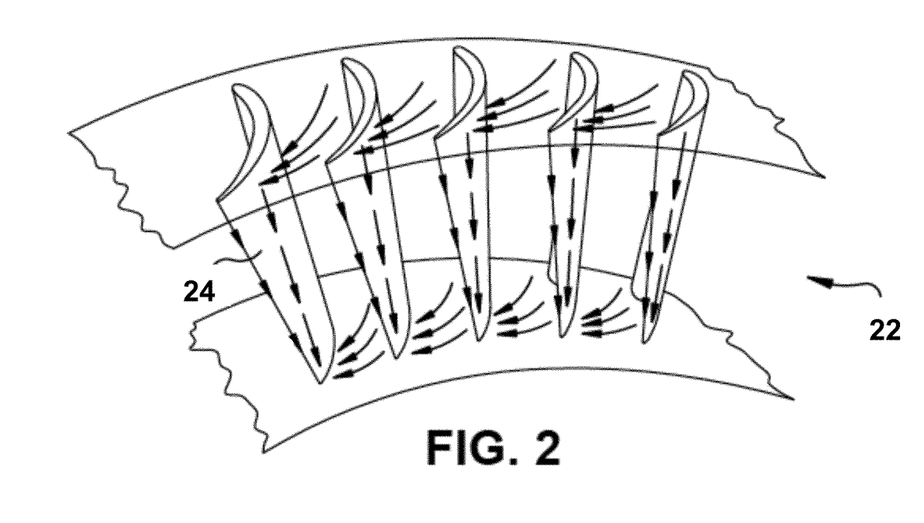
FIG. 2 shows a perspective view of a portion of a nozzle in accordance with an embodiment of the invention.

During operation, air at atmospheric pressure is compressed by a compressor and delivered to a combustion stage. In the combustion stage, the air leaving the compressor is heated by adding fuel to the air and burning the resulting air/fuel mixture. The gas flow resulting from combustion of fuel in the combustion stage then expands through turbine 10, delivering some of its energy to drive turbine 10 and produce mechanical power. To produce driving torque, in each stage, nozzle assembly 22 directs incoming gas from the combustion stage onto blades 20. This drives rotation of the rotor wheels 18, and as a result, shaft 14, producing mechanical power. As shown in FIG. 2, each nozzle assembly 22 includes a plurality of vanes 24, and may be formed of a plurality of individual arcuate nozzle segments arranged to form a ring disposed about rotor 12 in an assembled turbine 10.

Figure 3:
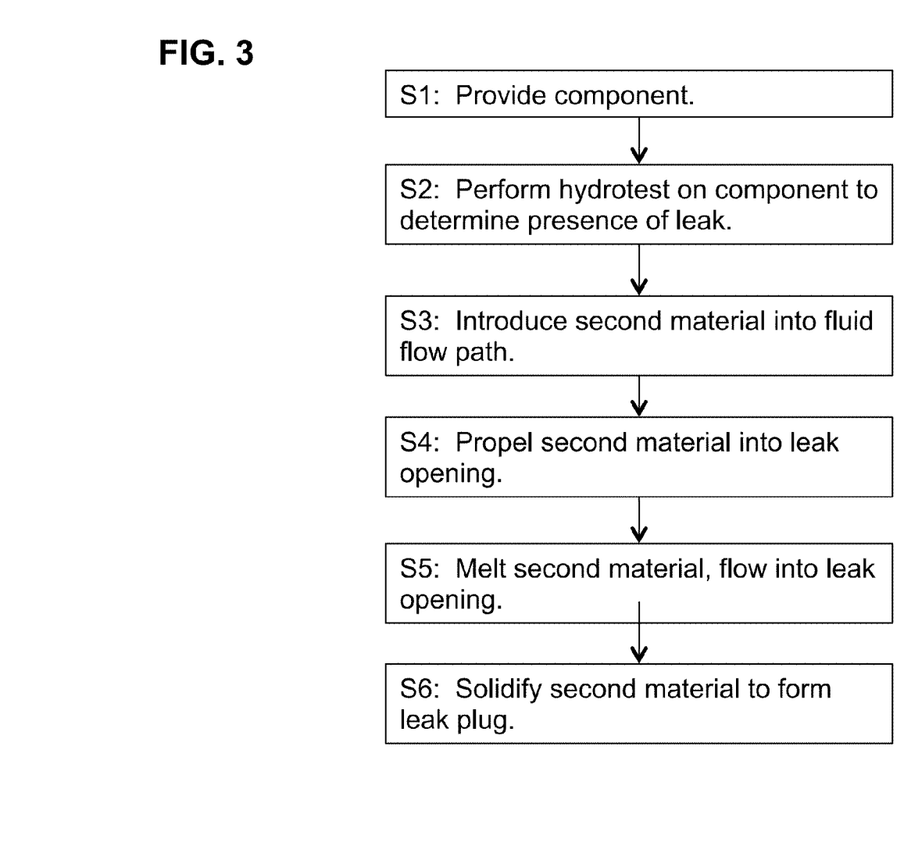
FIG. 3 shows a method flow diagram in accordance with an embodiment of the invention.
Figure 4:
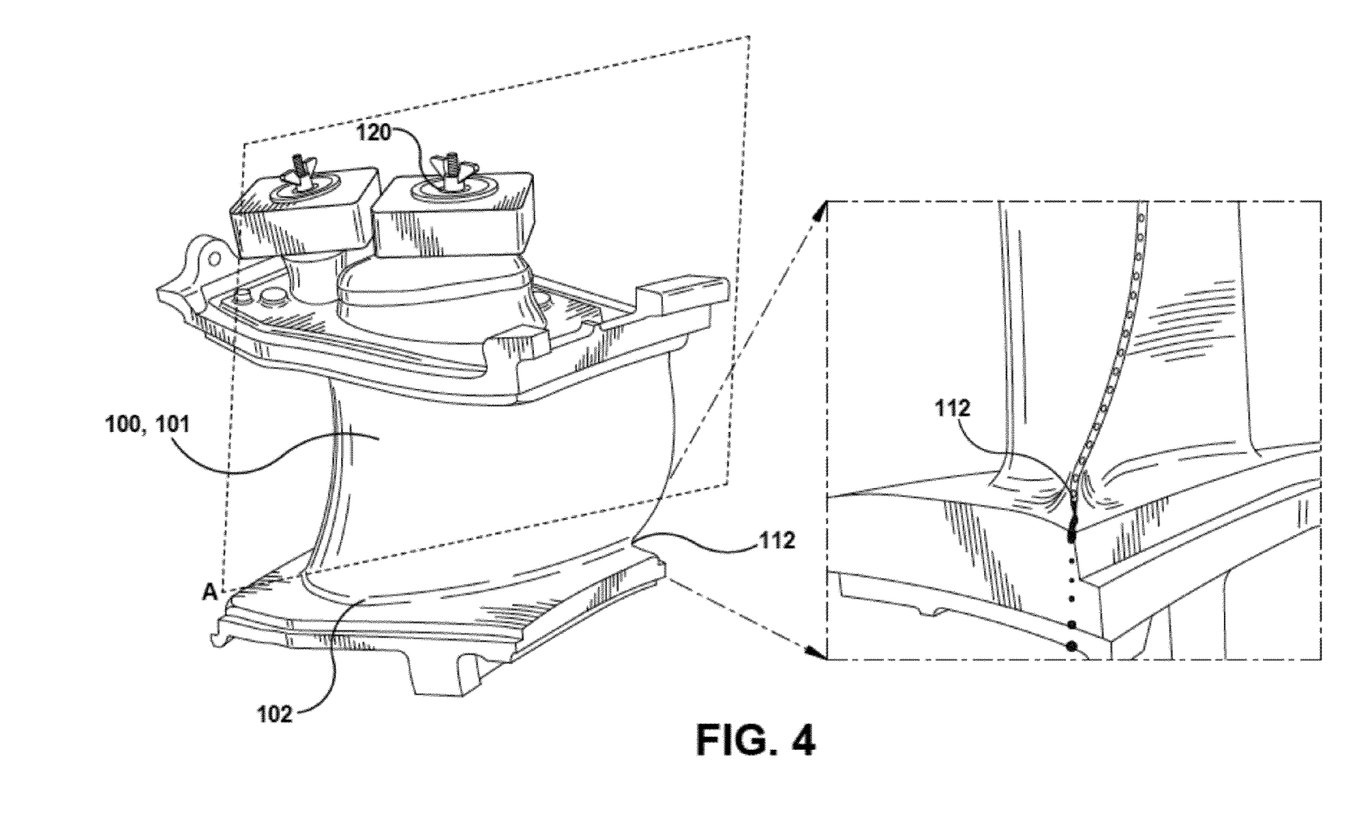
FIG. 4 shows a side view of a component in accordance with an embodiment of the invention.
Figure 6:
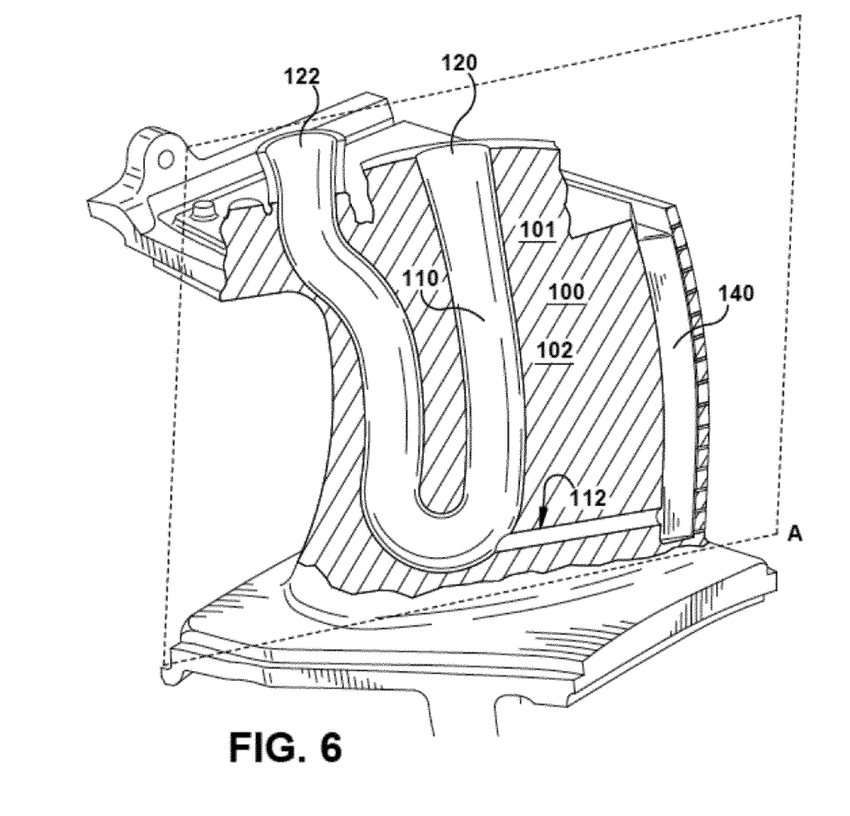
FIG. 6 shows a cutaway view along plane A (FIG. 4) of a component in accordance with an embodiment of the invention.

With reference to step S1 in the flow chart depicted in FIG. 3, a component 100 is provided. In various embodiments, component 100 may be any machine component having internal fluid flow passages therein. In particular, as shown in FIG. 4, component 100 may be a nozzle segment, although this is not intended to limit the disclosure to nozzle components. In any event, component 100 may include a body 101 having a first fluid flow path 110 therein, as illustrated in FIG. 6. Component 100 may be made of a first material 102 which may be, e.g., a single crystal superalloy, an equiaxed superalloy, or a directionally solidified (DS) superalloy, and may particularly be, for example, Rene 108, GTD111, GTD222, GTD241, or GTD262.

Figure 5:
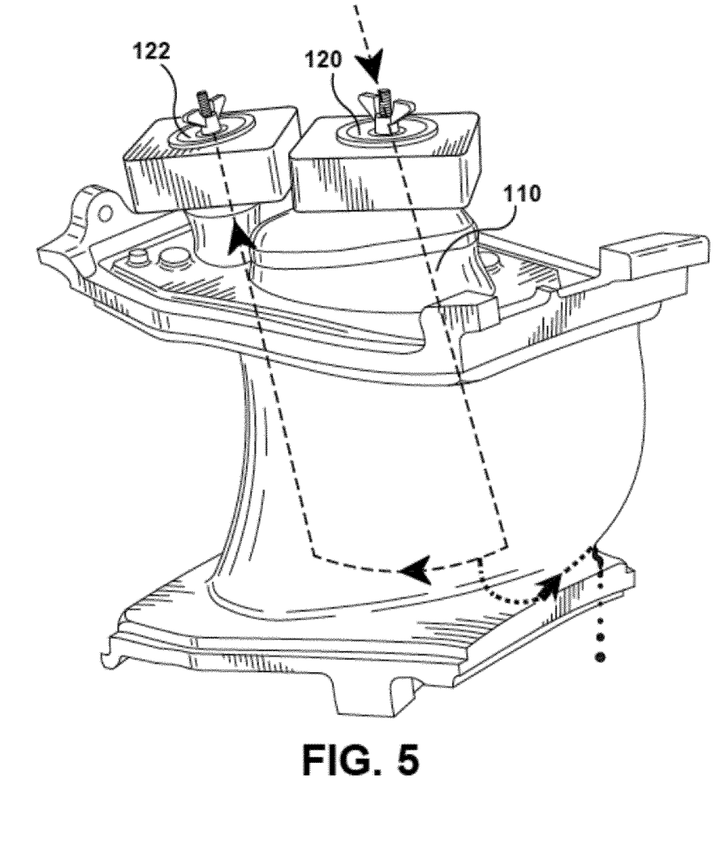
FIG. 5 shows a schematic view of a hydrotest of a fabricated component in accordance with an embodiment of the invention.

Component 100 may include an opening or leak 112 at a point anywhere along first fluid flow path 110 (FIG. 5). The presence and location of leak 112 (FIG. 4) may be determined by performing a hydrotest on component 100, as noted in FIG. 3 at step S2, and as illustrated in FIG. 5. Component 100 may be in final fabricated condition prior to performing the hydrotest. During the hydrotest, water enters component 100 under pressure through a first opening 120. Water then flows under pressure along first fluid flow path 110, and exits first fluid flow path 110 at second opening 122. In the embodiment pictured in FIG. 5, in which component 100 is a nozzle segment, first opening 120 may be a steam inlet, and second opening 122 may be a steam outlet. This embodiment is, however, only one example. If first fluid flow path 110 has any leaks 112, the pressurized water flow through first fluid flow path 110 may cause water to flow through the leak and emerge, e.g., on an exterior of component 100. In some embodiments, direct access to leak 112 itself may not be feasible, as leak 112 may be located on an interior of component 100, as shown in FIG. 6. In further embodiments, leak 112 may be too small to have been identified through visual inspection. Particularly, leak 112 may be a pore or a fissure in first material 102. A component 100 having such a leak 112 generally cannot be installed without first repairing the leak.

Figure 7:
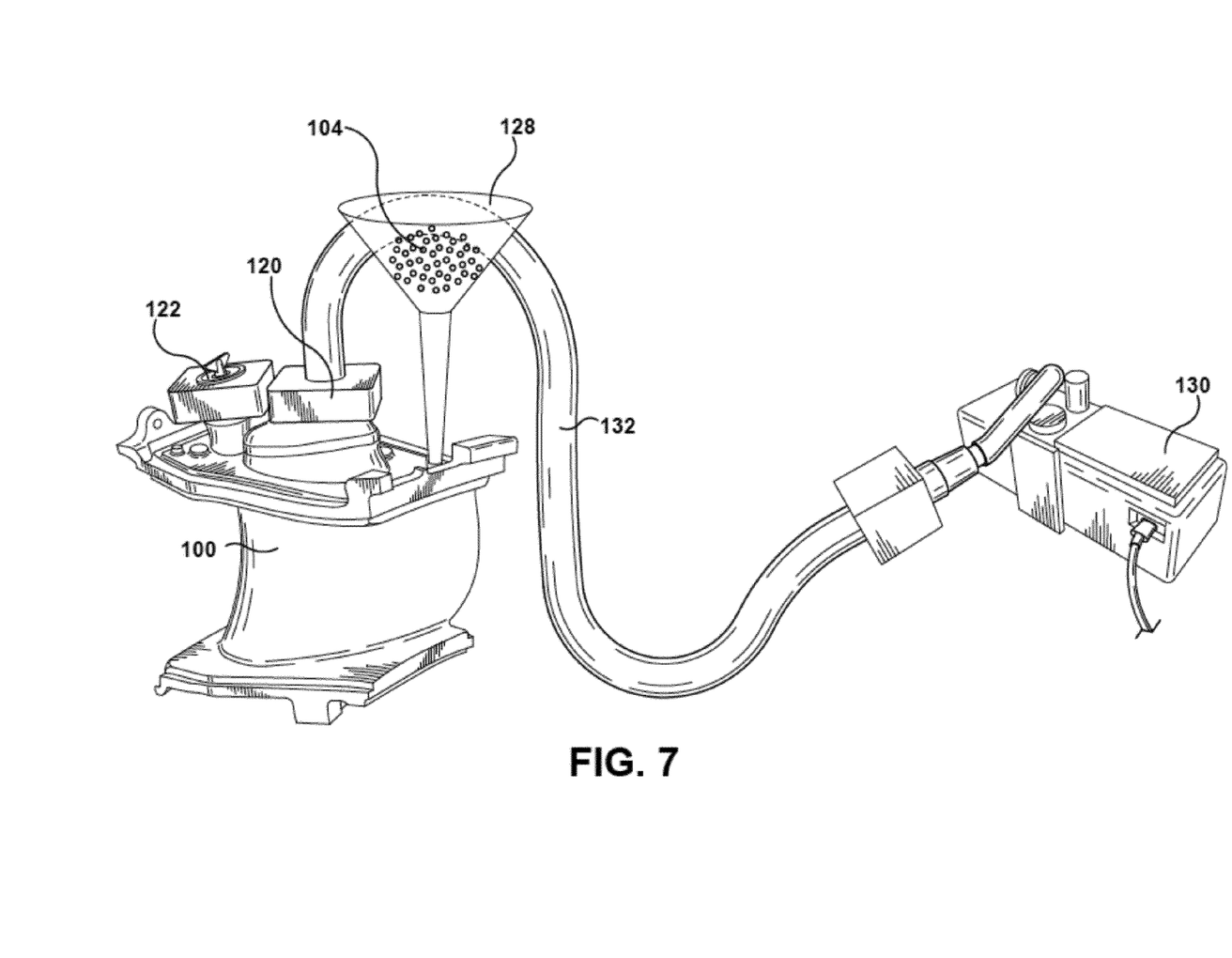
FIG. 7 shows a side schematic view of a component in accordance with an embodiment of the invention.

Referring again to FIG. 3, in step S3, a second material 104 is introduced into first fluid flow path 110, for example, using a funnel or syringe 128 to drop second material 104 into place (illustrated in FIG. 7). Second material 104 may be a brazing filler material. In various embodiments, second material 104 may be, e.g., BNi-2, BNi-5, BNi-9, or DF4B, and may further be in any of a number of forms including, but not limited to a powder, a foil, a paste, or a pre-sintered preform (PSP).

With continued reference to FIGS. 3 and 7, in step S4, second material 104 is propelled into the leak 112 in first fluid flow path 110. In one embodiment, this may be accomplished by sealably coupling first opening 120 to a vacuum pump 130 using a connecting hose 132, and closing off second opening 122. Under these conditions, the pumping of vacuum pump 130 causes second material 104 to accumulate around leak 112, and allows second material 104 to flow into leak 112 and occlude the leak 112.

In step S5, second material 104 may be melted, for example by placing component 100 in a furnace and performing a brazing thermal cycle. The temperature to which the component must be elevated will depend on the particular second material 104 and its melting point. After second material 104 has been melted, component 100 is allowed to cool. In step S6, second material 104 solifies as it cools, forming a plug that occludes leak 112, preventing fluid from leaking out of first fluid flow path 110 (illustrated in FIG. 8). Component 100 may then be re-hydrotested in the manner previously described and, once determined to be airtight, installed in a turbomachine and used successfully.

Figure 8:
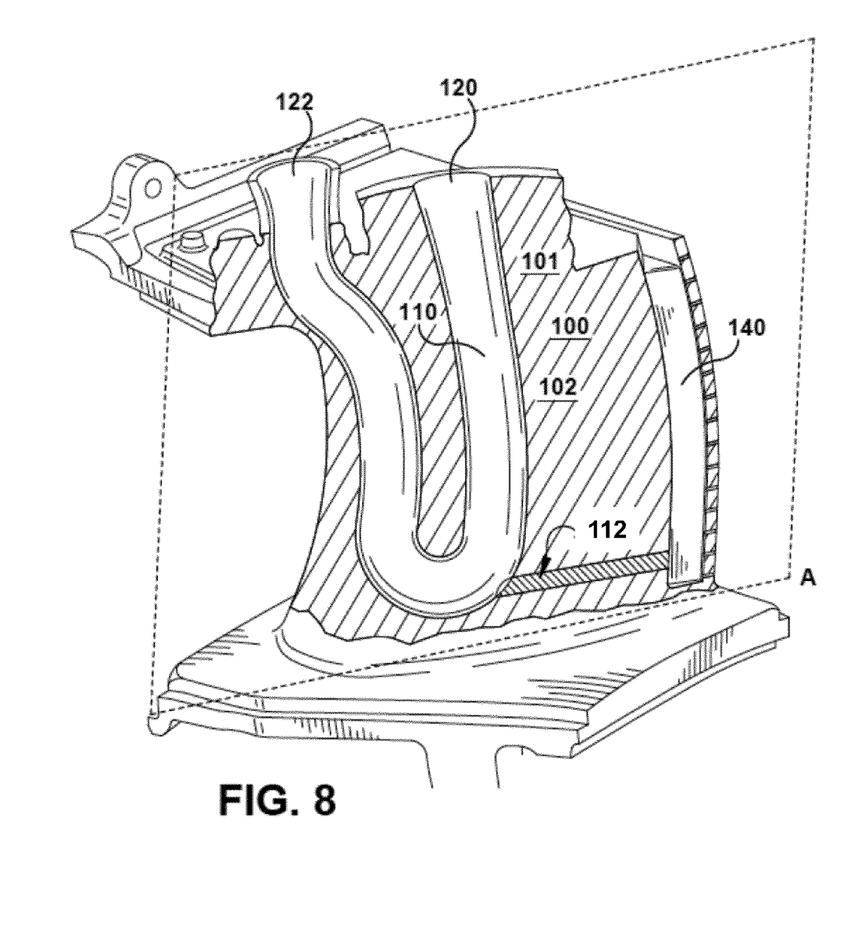
FIG. 8 shows a cutaway view along plane A (FIG. 4) of a component in accordance with an embodiment of the invention.

Also provided herein is a component 100 produced in accordance with the foregoing method, shown in FIG. 8.

As described above, component 100, which may in some embodiments be a nozzle, and more particularly may be a steam-cooled nozzle, includes a body 101 made of first material 102. In various embodiments, first material 102 may be, e.g., a single crystal superalloy, an equiaxed superalloy, or a directionally solidified (DS) superalloy, and may particularly be, for example, Rene 108, GTD111, GTD222, GTD241, or GTD262. Body 101 includes a first fluid flow path 110 therethrough. In some embodiments, body 101 may further include a second fluid flow path 140 through the body 101 that is separate from the first fluid flow path 110. First and second fluid flow paths 110, 140 may conduct steam and air, or air and steam respectively through component 100.

First fluid flow path 110 may include a leak 112 in first material 102, disposed such that the first fluid flow path 110 is not sealably enclosed by the first material 102. In some embodiments, leak 112 may put first fluid flow path 110 in fluid communication with second fluid flow path 140, as shown in FIG. 6. In other embodiments, leak 112 may allow fluid to escape from first fluid flow path 110 to an interior or exterior of component 100, or other location. In either case, leak 112 may be caused by, e.g., a pore or a fissure in the first material 102, and may or may not be directly accessible from an exterior of component 100.

Where material 102 includes a leak 112, a second material 104 may be provided to occlude the leak 112 such that there is no fluid egress from, e.g., first fluid flow path 110. As described above, second material 104 may be, for example, one of BNi-2, BNi-5, BNi-9, or DF4B, and may be in the form of a powder, a foil, a paste, or a pre-sintered preform (PSP) that is subjected to a braze cycle. Component 100, including a plug made of second material 104 filling leak 112 as shown in FIG. 8, may be hydrotested in the manner previously described and, once determined to be airtight, installed in a turbomachine and used successfully in the field.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising:
   providing a component having a fluid flow path therein, wherein the component includes a first material;
   introducing a second material into the fluid flow path;

propelling the second material into a leak in the fluid flow path, wherein the propelling further comprises vacuum pumping the second material into the fluid flow path;

melting the second material; and solidifying the second material, wherein the solidified second material occludes the leak.

2. The method of claim 1, further comprising:

prior to the introducing, performing a hydrotest to identify a location of the leak in the fluid flow path.

3. The method of claim 2, wherein the component is in final fabricated condition prior to performing the hydrotest.

4. The method of claim 2, wherein the location of the leak is not directly accessible from an exterior of the component.

5. The method of claim 1, wherein the component comprises a gas turbine nozzle.

6. The method of claim 1, wherein the second material comprises a braze filler material, and further comprises one of BNi-2, BNi-5, BNi-9, or DF4B.

7. The method of claim 1, wherein the second material comprises a powder, a foil, a paste, or a pre-sintered preform (PSP).

8. The method of claim 1, wherein the leak includes one of a pore or a fissure in the first material.

9. The method of claim 8, wherein the first material comprises one of a single crystal superalloy, an equiaxed superalloy, or a directionally solidified (DS) superalloy.

10. A component comprising:

a body comprising a first material, wherein the body includes a first fluid flow path therethrough and a second fluid flow path through the body that is separate from the first fluid flow path, wherein one of the first fluid flow path or the second fluid flow path conducts steam through the component, and the other of the first fluid flow path or the second fluid flow path conducts air through the component;

a leak in the first material disposed such that the first fluid flow path is not sealably enclosed by the first material; and a second material occluding the leak such that there is no fluid egress from the first fluid flow path.

11. The component of claim 10, wherein the component further comprises a nozzle.

12. The component of claim 11, wherein the nozzle is steam-cooled.

13. The component of claim 10, wherein the leak fluidly connects the first fluid flow path and the second fluid flow path.

14. The component of claim 10, wherein the first material comprises one of a single crystal superalloy, an equiaxed superalloy, or a directionally solidified (DS) superalloy.

15. The component of claim 10, wherein the second material comprises one of BNi-2, BNi-5, BNi-9, or DF4B.

16. The component of claim 10, wherein the second material comprises a powder, a foil, a paste, or a pre-sintered preform (PSP) that is subjected to a braze cycle.

17. The component of claim 10, wherein the leak further comprises one of a pore or a fissure in the first material.

18. The component of claim 10, wherein the leak is not directly accessible from an exterior of the component.

19. A component comprising:

a body comprising a first material, wherein the body includes a first fluid flow path through the body and a second fluid flow path through the body that is separate from the first fluid flow path;

a leak in the first material disposed such that the first fluid flow path is not sealably enclosed by the first material, wherein the leak is not directly accessible from an exterior of the component; and a second material occluding the leak such that there is no fluid egress from the first fluid flow path.

20. The component of claim 19, wherein the first material comprises one of a single crystal superalloy, an equiaxed superalloy, or a directionally solidified (DS) superalloy, and the second material comprises one of BNi-2, BNi-5, BNi-9, or DF4B.

* * * * *